United States Patent [19]
Tomoyori et al.

[11] Patent Number: 4,483,107
[45] Date of Patent: Nov. 20, 1984

[54] POLISHING METHOD FOR ELECTROPHOTOGRAPHIC PHOTOCONDUCTIVE MEMBER

[75] Inventors: Kageyuki Tomoyori; Tatsuo Uchida; Tadashi Noda, all of Hachioji, Japan

[73] Assignee: Konishiroku Photo Industry Co., Ltd., Tokyo, Japan

[21] Appl. No.: 447,687

[22] Filed: Dec. 7, 1982

Related U.S. Application Data

[62] Division of Ser. No. 272,013, Jun. 9, 1981, abandoned.

[30] Foreign Application Priority Data

Jun. 17, 1980 [JP] Japan ................................ 55-80899
Jun. 17, 1980 [JP] Japan ................................ 55-80901

[51] Int. Cl.$^3$ ............................................. B24B 1/00
[52] U.S. Cl. .................................. 51/281 R; 51/298; 528/14
[58] Field of Search ................ 51/298, 281 R; 528/14

[56] References Cited

U.S. PATENT DOCUMENTS 3,017,386  1/1962  Brown, Jr. et al. ................... 528/14
3,208,972  9/1965  Lyons ................................... 528/14
3,318,844  5/1967  Krantz .................................. 528/14
3,372,133  3/1968  Krantz .................................. 528/14

FOREIGN PATENT DOCUMENTS 4412197  3/1969  Japan .
5479037  6/1979  Japan .

Primary Examiner—James Derrington
Attorney, Agent, or Firm—Frishauf, Holtz, Goodman & Woodward

[57] ABSTRACT

A method of polishing an electrophotographic photoconductive member, which comprises polishing said surface with polishing particles selected from the group consisting of solid organic polishing particles composed of a polysilsesquioxane having, on its silicon atoms, substituents selected from a lower alkyl group having 2 to 5 carbon atoms, an alkoxy group, an aryl group and an aralkyl group; a combination of said solid organic polishing particles and solid inorganic polishing particles; and a combination of solid organic polishing particles composed of polymethylsilsesquioxane and solid inorganic polishing particles.

11 Claims, No Drawings

POLISHING METHOD FOR ELECTROPHOTOGRAPHIC PHOTOCONDUCTIVE MEMBER

This is a division of application Ser. No. 272,013 filed June 9, 1981, now abandoned.

The present invention relates to a polishing material to be used for polishing an electrophotographic photoconductive member.

An electrophotographic photoconductive member usually comprises a support and a photoconductive light sensitive layer coated thereon. As such a support, there is commonly used a plate of a metal such as stainless steel, copper, aluminum or silver, or a sheet of an optional material such as paper or a resin film. However, in some cases, the support may be omitted. As the light sensitive layer, there are known a layer which is formed by vapour deposition of an inorganic photoconductive substance such as sulfur, selenium and lead oxide and an alloy or an intermetallic compound composed of, or sulfur, selenium, tellurium, arsenic, antimony, etc; a layer which is formed by deposition, by a sputtering method, of a photoconductive substance having a high melting point such as zinc oxide, cadmium sulfide, cadmium selenide or titanium oxide; a layer which is formed by coating an organic photoconductive substance such as polyvinylcarbazole, anthracene, or phthalocyanine or an organic photoconductive substance sensitized by a pigment or a Lewis acid, alone or as a mixture with a suitable insulating binder resin; and a layer which is formed by dispersing in an insulating binder resin an inorganic photoconductive substance such as zinc oxide, cadmium sulfide, titanium oxide or lead oxide.

The surface of the photoconductive layer of the above mentioned electrophotographic photoconductive member, plays a very important role for forming an electrophotographic image by an electrophotographic process. However, during the electrophotographic process, the surface is subject to contamination by a developer in the developing operation, it is subject to electric or optical damages or destruction by an electric shock or activated ray due to corona discharge in the charging operation or the exposing operation, or it is subject to mechanical abrasion in the cleaning operation. Thus, the surface receives various damages and contaminations during repeated use.

Especially when the photoconductive layer is composed of selenium or it contains selenium as the major component, it is quite likely to be affected by influences of the environment such as the temperature, humidity or dust, under which the photoconductive member is situated, and its image forming characteristics are likely to be impaired.

Particularly, the selenium base photoconductive layer is susceptible to contamination by a powdery developer composed of a thermoplastic resin, and it is likely that a so-called toner filming phenomenon occurs at its surface. Further, as selenium is in an amorphous state, it is quite likely that crystallization of the surface layer is led, for instance, by corona discharge, and furthermore, the crystallization is facilitated by the formation of nuclei due to deposition of a hygroscopic substance. Furthermore, its properties are likely to be deteriorated by deposition of an acid or an alkali.

The property deteriorations which bring about degradation of the image forming characteristics, occur at the surface layer of the photoconductive layer in most cases. Accordingly, it is possible to restore good image forming characteristics by polishing the surface of the photoconductive layer with a suitable polishing material and removing the deteriorated surface layer to expose a fresh surface.

However, in addition to the requirement for good polishing effectiveness, there are the following requirements for the polishing materials for electrophotographic photoconductive members. Namely, it is required (1) that a mirror surface or an equivalently polished surface is obtainable without roughening the surface, (2) that the electric conductivity over the entire surface of the photoconductive layer is not increased, (3) that the properties of the photoconductive layer are not deteriorated by the polishing, (4) that a clean surface is obtainable upon completion of the polishing, and (5) that the polishing operation can readily and simply be carried out, or else.

As a polishing material of this type, there has hitherto been known e.g. the one disclosed in Japanese Patent Publication No. 12197/69. This polishing material is prepared by dispersing in a volatile solvent, inorganic polishing particles such as cerium oxide, chromium oxide, or zirconium oxide, having a particle size of at most 1.5 microns and fine solid lubricant powder, whereby the polishing effectiveness of the inorganic polishing particles is controlled and reduced by the effect of the fine solid lubricant powder as a result of the evaporation of the solvent at the final stage of the polishing operation, so that mirror surface finishing is thereby accomplished.

The polishing effectiveness of this polishing material is derived solely from the inorganic particles and it is effective for the grinding of the surface layer. However, practically, the fine solid lubricant powder is effective only for a short period of time as the evaporation rate of the volatile solven is high, and accordingly it is difficult to accomplish satisfactory mirror surface finishing. Further, as the fine sold lubricant powder has a particle size smaller than that of the inorganic polishing particles, it is likely that the lubricant powder deposits on the surface of the photoconductive layer upon the completion of the polishing operation. Accordingly, when it is used for polishing the surface of the photoconductive layer of an electrophotographic photoconductive member, it does not necessarily give a satisfactory mirror surface, and thus it has a drawback that it is incapable of adequately restoring the function of the electrophotographic photoconductive member. Further, in practice, the evaporation of the volatile solvent directly contributes to the polishing mechanism and accordingly, it is necessary to accurately control the amount of the volatile solvent. Further, in the actual polishing operation, it is strongly required that the polishing be completed quickly. Thus, there is a disadvantage that there are substantial restrictions.

Further, the inorganic solid polishing particles dispersed in the solvent of such a polishing material, tend to grind the surface to be polished, excessively and in many cases, it is likely that there remain lots of abrasion scars. Accordingly, in order to obtain a mirror surface in the subsequent dry polishing process, it is necessary to polish the surface for a long period of time. Besides, a substantial amount of ground particles from the polished layer will be included in the polishing material, and they tend to deposit on the polished surface, thus giving an adverse effect e.g. to the performance of the electrophotographic photoconductive member.

Other than the above, Japanese Patent Publication No. 79037/79 discloses that particles composed of polymethylsilsesquioxane are used as a polishing material for an electrophotographic photoconductive member. However, with the particles composed of polymethylsilsesquioxane, it is impossible to obtain an effect for removing the surface layer of the degraded photoconductive layer by polishing. Further, they have a drawback that the polishing operation requires a long period of time and great labour.

The present invention has an object to eliminate the above mentioned drawbacks, and to provide a polishing material for an electrophotographic photoconductive member, which is capable of providing adequate polishing effectiveness and mirror surface effectiveness against the photoconductive layer of the electrophotographic photoconductive member, capable of certainly accomplishing the desired polishing, and capable of adequately restoring the function or characteristics of the electrophotographic photoconductive member.

Another object of the present invention is to provide a polishing material for an electrophotographic photoconductive member, which is capable of adequately restoring the surface of the photoconductive layer of the photoconductive member without giving any chemical change to the photoconductive layer, without increasing the electroconductivity over the surface of the photoconductive layer and without accompanying other adverse effects.

A further object of the present invention is to provide a polishing material for an electrophotographic photoconductive member, which is capable of effectively grinding the surface layer of the photoconductive layer in the polish working step, and at the same time, capable of accomplishing mirror surface finishing of the surface of the photoconductive layer.

Another object of the present invention is to provide a polishing material which is capable of accomplishing adequate polishing in a quite simple operation.

Thus, the present invention provides a method of using a polishing material for polishing an electrophotographic photoconductive member, which comprises using polishing particles selected from the group consisting of solid organic polishing particles composed of a polysilsesquioxane having, on its silicon atoms, substituents selected from a lower alkyl group having 2 to 5 carbon atoms, an alkoxy group, an aryl group and an aralkyl group; a combination of said solid organic polishing particles and solid inorganic polishing particles; and a combination of solid organic polishing particles composed of polymethylsilsesquioxane and solid inorganic polishing particles.

Namely, according to the present invention, in the case where the substituents attached to the silicon atoms of the polysilsesquioxane, are a methyl group (i.e. in the case of polymethylsilsesquioxane), no desired effectiveness is obtainable unless the polymethylsilsesquioxane particles are combined with solid inorganic polishing particles. Whereas, in the case where the substituents on the silicon atoms, are other than a methyl group, i.e. a lower alkyl group having 2 to 5 carbon atoms, an alkoxy group, an aryl group or an aralkyl group, the polishing material may be composed solely of the solid organic polishing particles, or it may be a combination of the solid organic polishing particles (polysilsesquioxane) and solid inorganic polishing particles. Practically, the latter is preferred in most cases.

The lower alkyl having 2 to 5 carbon atoms as a substituent on the silicon atoms of the polysilsesquioxane constituting the solid organic polishing partciles of the present invention, may be, for instance, ethyl, n-propyl, isopropyl, n-butyl, sec-butyl, tert-butyl, n-pentyl, isopentyl, or neopentyl. The alkoxy group is usually a lower alkoxy group having 1 to 5 carbon atoms, such as ethoxy, propoxy, or butoxy, although it may be a middle class or higher alkoxy group. As the aryl group, there may be mentioned a substituted or unsubstituted aryl group such as phenyl. As the aralkyl group, there may be mentioned a substituted or unsubstituted aralkyl group such as benzyl. Further, the substituents on the silicon atoms in the molecule of the polysilsesquioxane, may be the same or different.

As specific examples of the polysilsesquioxane, those having the following structures are preferably used.

 (1)

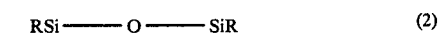 (2)

 (3)

 (4)

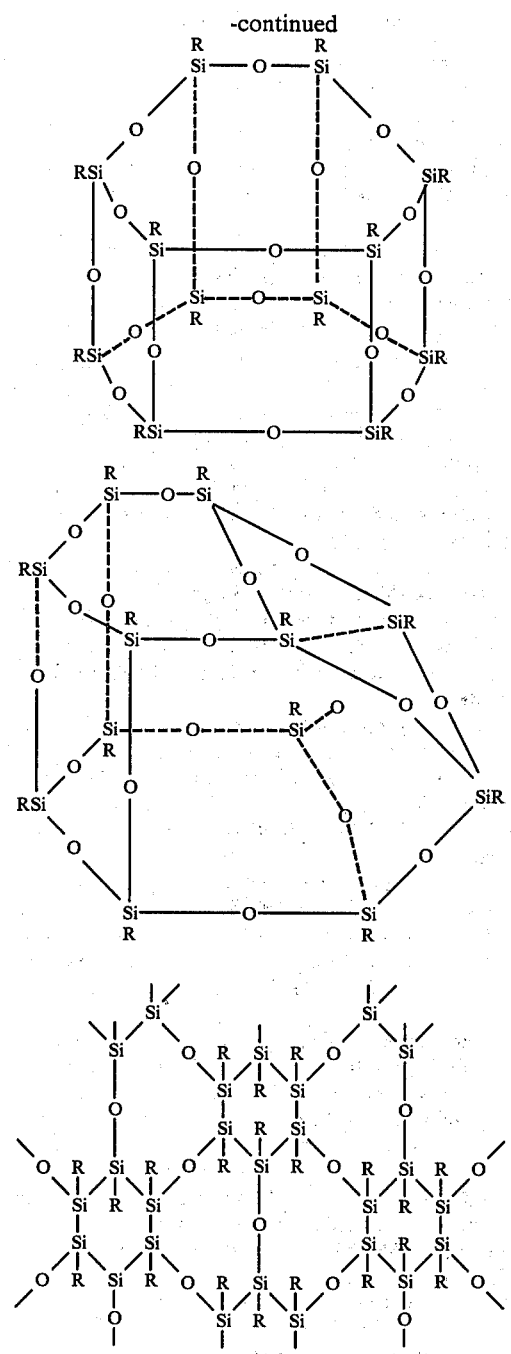

The above mentioned solid organic polishing particles may be used in a single kind or in a combination of two or more kinds.

An average particle size of the polysilsesquioxane as the solid organic polishing particles to be used for the polishing material of the present invention, is usually from 1 to 50 microns, preferably from 2 to 20 microns.

The polishing material of the present invention may contain, in addition to the above mentioned solid organic polishing particles, other polishing particles. For instance, the following known solid inorganic polishing particles may be incorporated: For instance, powder particles of Carborundum, Alundum, emery, garnet, corundum, chromium oxide, cerium oxide, lime, tripoli, Rockcite, Celiute, zirconium oxide, bentonite, terra abla, calcium carbonate, or calcium phosphate, and further, powder particles of silicates of zirconium, lead, cobalt, nickel, magnesium, calcium, strontium, barium, aluminum or zinc; hexafluorosilicates of sodium, potassium, magnesium, calcium, strontium, barium, zinc, or aluminum; sulfates of barium, calcium, aluminum or magnesium; silicon carbide; silicon oxide; boron nitride; and the like, may be mentioned. These solid inorganic polishing particles may be added in a single kind or in a combination of two or more kinds. The average particle size of the particles is preferably at most 5 microns, more preferably at most 2 microns.

In such a case, it is necessary that said solid organic polishing particles have an average particle size greater than the average particle size of the above mentioned solid inorganic polishing particles. The solid organic polishing particles suitably have a definitely large average particle size at a level of at least 7 microns, preferably at least 10 microns.

Further, the ratio of the solid inorganic polishing particles and the solid organic polishing particles, is preferably within a range of 1:9 to 9:1 by weight. If the proportion of the solid inorganic particles is less than 10% by weight relative to the total polishing particles, no adequate polishing effectiveness is obtainable. On the other hand, if the proportion exceeds 90% by weight, no adequate mirror surface effectiveness is obtainable.

The polishing material of the present invention having the above mentioned composition, is dispersed in a suitable dispersing medium or wetting liquid, and then applied to e.g. an absorbent cotton, gauze or cloth, and the polishing of the surface of an object to be polished is carried out by rubbing the surface with such a cotton, gauze or cloth.

The above mentioned dispersing medium or wetting liquid may not necessarily be volatile, and may be any optional liquid so long as it does not deteriorate the object to be polished or does not impair the properties required for the object to be polished, and which is capable of satisfactorily dispersing the polishing material therein. However, when a nonvolatile liquid is used, it is in some cases difficult to completely remove the liquid. Accordingly, it is preferred that a liquid having a certain volatility is used. However, it is necessary that the polishing particles be maintained in a wet state until the polishing is completed. Further, the use of a toxic or dangerous liquid should be avoided.

As mentioned above, the polishing material of the present invention contains solid organic polishing particles composed of a polysilsesquioxane, and accordingly an adequate polishing effectiveness is thereby obtained. At the same time, due to the elasticity or yieldability derived from the organic nature, unnecessary excessive grinding can be avoided and it is possible to obtain a mirror surface effectiveness by wet polishing.

Namely, a polishing material composed solely of inorganic polishing particles, is likely to give fine scars to the polished surface and, at the same time, likely to be trapped in the scars. The polishing material of the present invention comprising solid organic polishing particles, is free from such a possibility, and even when solid inorganic polishing particles were trapped in such scars, they would be scraped out by the solid organic polishing particles. Thus, it is possible to polish an object to have a mirror surface having no surface contamination. Thus, the polishing material of the invention is extremely useful for the polishing of an electrophotographic photoconductive member. For instance, it is possible to polish a deteriorated surface layer of a photoconductive layer thereby to obtain a mirror surface having a good image forming characteristics.

As the solid organic polishing particles are composed of a resin having a net structure, a great elasticity of the solid polishing particles is thereby obtainable, and thus the above mentioned effectiveness is certainly obtainable.

With use of the polishing material of the present invention wherein the solid organic polishing particles are combined with solid inorganic polishing particles, the grinding of the surface layer of the photoconductive layer of an electrophotographic photoconductive member will be done by the solid inorganic polishing particles, and at the same time, the surface having any scars formed by the solid inorganic polishing particles will be polished and smoothed by the coexisting solid organic polishing particles, whereby adequate grinding effectiveness and mirror surface effectiveness will be obtained. Namely, so-called hard polishing by the solid inorganic polishing particles and so-called soft polishing are performed always simultaneously. Thus, for the practical purpose, apart from a strict standpoint, it is thereby possible to accomplish effective polishing of the photoconductive layer of an electrophotographic photoconductive member while maintaining the mirror surface.

Such effectiveness may be increased by adjusting the average particle size of the solid organic polishing particles to be greater, preferably definitely greater, than the average particle size of the solid inorganic polishing particles.

As the polishing material of the present invention contains the above mentioned solid organic polishing particles, the contact pressure of the solid inorganic polishing particles against the surface of the photoconductive layer during the polishing operation, is uniformly distributed by the elasticity of the solid organic polishing particles and a local concentration of the contact pressure is thereby prevented, whereby the polishing can be done uniformly or evenly. Further, no adverse effect will be imparted to the electrophotographic photoconductive member by the polishing. It is possible to satisfactorily restore the electric characteristics of the photoconductive layer.

Further, with use of the polishing material of the present invention, the desired effectiveness is certainly obtainable even if the polishing is not continued till the wetting liquid evaporates. Accordingly, the polishing operation becomes quite easy without restriction.

Furthermore, if necessary, other auxiliary agents may be incorporated into the polishing material of the present invention. However, those which adversely affect the surface of the photoconductive layer, should be avoided.

Further, the polishing material for an electrophotographic photoconductive member according to the present invention, may be used not only for the photoconductive member, but also for other objects such as glass, metal, plastics, semiconductors or insulators.

Now, the present invention will be described with reference to the following Examples. However, it should be understood that the present invention is not limited to these Examples.

EXAMPLES 1 to 12

(1) A polishing material composed of polyethylsilsesquioxane polishing particles having an average particle size of about 8 microns (Sample 1)

(2) A polishing material composed of the polyethylsilsesquioxane polishing particles of Sample 1, which contains 15% by weight of cerium oxide polishing particles (Sample 2)

(3) A polishing material composed of polypropylsilsesquioxane polishing particles (Sample 3)

(4) A polishing material composed of the polypropylsilsesquioxane polishing particles of Sample 3, which contains 15% by weight of cerium oxide polishing particles (Sample 4)

(5) A polishing material composed of polymethoxysilsesquioxane polishing particles (Sample 5)

(6) A polishing material composed of the polymethoxysilsesquioxane polishing particles of Sample 5, which contains 15% by weight of cerium oxide polishing particles (Sample 6)

(7) A polishing material composed of polypropoxysilsesquioxane polishing particles (Sample 7)

(8) A polishing material composed of the polypropoxysilsesquioxane of Sample 7, which contains 15% by weight of cerium oxide polishing particles (Sample 8)

(9) A polishing material composed of polyphenylsilsesquioxane polishing particles (Sample 9)

(10) A polishing material composed of the polyphenylsilsesquioxane polishing particles of Sample 9, which contains 15% by weight of cerium oxide polishing particles (Sample 10)

(11) A polishing material composed of polybenzylsilsesquioxane polishing particles (Sample 11)

(12) A polishing material composed of the polybenzylsilsesquioxane polishing particles of Sample 11, which contains 15% by weight of cerium oxide polishing particles.

Five grams of each of Samples 1 to 15 was dispersed in 15 ml of a ligroin liquid. Twelve sheets of absorbent cotton were soaked with the respective dispersions thereby obtained. Thus, 12 different kinds of polishing cotton sheets were prepared.

On the other hand, a total of 12 electrophotographic photoconductive members (Photoconductive members 1 to 12) having a selenium-tellurium photoconductive layer containing 5% by weight of tellurium and having their characteristics degraded through use, were ready. The photoconductive layers of Photoconductive members 1 to 12 were polished by Samples 1 to 12, respectively, i.e. Photoconductive member 1 was polished by Sample 1, Photoconductive member 2 was polished by Sample 2 and so forth. The surface roughness and the electrophotographic characteristics were investigated before and after the polishing operation.

Namely, with respect to the electrophotographic characteristics, the surface potential V of the photoconductive layer when charged by Corotoron charger with a voltage of 6000 volts, the surface potential $V_0$ upon expiration of 5 seconds after charging, the potential holding rate, and the residual potential $V_1$ were measured. The results thereby obtained are shown in Tables 1 and 2.

COMPARATIVE EXAMPLES 1 AND 2

Further, a polishing material composed solely of cerium oxide polishing particles was designated as Comparative Sample 1, and a polishing material composed of cerium oxide polishing particles and 10% by weight of zinc stearate, was designated as Comparative Example 2. With use of these Comparative Samples, photoconductive layers of two electrophotographic photoconductive members (Photoconductive members 13, and 14) similar to the above mentioned, were polished, and the same measurements as in the case for the Samples, were conducted. The results thereby obtained, are also shown in Tables 1 and 2.

TABLE 1

(Before polishing)

| | Sample Nos. | Photoconductive members | Surface roughness ($\mu$m) | V (volts) | $V_0$ (volts) | Holding rates (%) | $V_1$ (volts) |
|---|---|---|---|---|---|---|---|
| Examples | 1 | 1 | 0.1 | 500 | 190 | 38.0 | 38 |
| | 2 | 2 | 0.2 | 520 | 218 | 42.0 | 40 |
| | 3 | 3 | 0.1 | 550 | 205 | 37.3 | 51 |
| | 4 | 4 | 0.3 | 500 | 200 | 40.0 | 50 |
| | 5 | 5 | 0.2 | 510 | 196 | 38.5 | 52 |
| | 6 | 6 | 0.2 | 520 | 204 | 39.2 | 49 |
| | 7 | 7 | 0.1 | 490 | 197 | 40.1 | 50 |
| | 8 | 8 | 0.2 | 500 | 191 | 38.2 | 52 |
| | 9 | 9 | 0.1 | 480 | 202 | 42.0 | 51 |
| | 10 | 10 | 0.2 | 490 | 197 | 40.2 | 48 |
| | 11 | 11 | 0.2 | 520 | 201 | 38.7 | 55 |
| | 12 | 12 | 0.3 | 510 | 194 | 38.1 | 50 |
| Comparative Examples | 1 | 13 | 0.1 | 540 | 221 | 41.0 | 48 |
| | 2 | 14 | 0.1 | 510 | 190 | 37.3 | 50 |

TABLE 2

(After polishing)

| | Sample Nos. | Photoconductive members | Polishing materials | Surface roughness ($\mu$m) | V (volts) | $V_0$ (volts) | Holding rates (%) | $V_1$ (volts) |
|---|---|---|---|---|---|---|---|---|
| Examples | 1 | 1 | Sample 1 | 0.2 | 800 | 712 | 89.0 | 7 |
| | 2 | 2 | Sample 2 | 0.2 | 820 | 705 | 86.0 | 8 |
| | 3 | 3 | Sample 3 | 0.2 | 810 | 729 | 90.0 | 5 |
| | 4 | 4 | Sample 4 | 0.3 | 820 | 726 | 88.5 | 6 |
| | 5 | 5 | Sample 5 | 0.2 | 860 | 791 | 92.0 | 8 |
| | 6 | 6 | Sample 6 | 0.3 | 850 | 757 | 89.0 | 7 |
| | 7 | 7 | Sample 7 | 0.2 | 830 | 706 | 85.0 | 10 |
| | 8 | 8 | Sample 8 | 0.2 | 790 | 679 | 86.0 | 12 |
| | 9 | 9 | Sample 9 | 0.3 | 820 | 652 | 79.5 | 8 |
| | 10 | 10 | Sample 10 | 0.3 | 810 | 640 | 79.0 | 9 |
| | 11 | 11 | Sample 11 | 0.3 | 790 | 632 | 80.0 | 5 |
| | 12 | 12 | Sample 12 | 0.4 | 780 | 640 | 82.0 | 7 |
| Comparative Examples | 1 | A | Comparative Sample 1 | 0.7 | 680 | 479 | 70.5 | 35 |
| | 2 | B | Comparative Sample 2 | 0.4 | 720 | 518 | 72.0 | 38 |

From the above results, it is seen that with use of the polishing materials of the present invention, adequate polishing effectiveness and mirror surface effectiveness are obtainable, and especially, superior effectiveness is obtainable when they are applied to the polishing of the photoconductive layer of electrophotographic photoconductive members. Whereas, it is seen that with use of polishing materials composed solely of solid inorganic polishing particles, no mirror surface effectiveness is obtainable and no satisfactory restoration of good electrophotographic characteristics is attainable.

EXAMPLES 13 to 17

Cerium oxide particles having an average particle size of 0.3 micron and polymethylsilsesquioxane particles having an average particle size of 10 microns, were mixed in the weight ratios shown in the following Table 3, whereby a total of 5 kinds of polishing materials (Samples 13 to 17) of the present invention were obtained.

TABLE 3

| Polishing materials | Cerium oxide (g) | Polymethylsilsesquioxane (g) |
|---|---|---|
| Sample 13 | 0.5 | 4.5 |
| Sample 14 | 1.5 | 3.5 |
| Sample 15 | 2.5 | 2.5 |
| Sample 16 | 3.5 | 1.5 |
| Sample 17 | 4.5 | 0.5 |

Five grams of each of these Samples 13 to 17 was dispersed in 15 ml of ethyl alcohol. With use of absorbent cotton sheets soaked with the respective dispersions, the photoconductive layers of five electrophotographic photoconductive members 13 to 17, which are composed of a vapour deposited layer of selenium-tellurium containing 5% by weight of tellurium, were polished. The surface roughness of the electrophotographic photoconductive members 13 to 17 before and after the polishing, the surface potential V when charged by a corona charger with a voltage of 6000 volts, the surface potential $V_0$ upon expiration of 5 seconds after the charging, the potential holding rates, and the residual potential $V_1$ after the exposing operation, were as shown in Tables 4 and 5. Upon completion of the polishing, there still remained ethyl alcohol in the absorbent cotton.

COMPARATIVE EXAMPLES 3 AND 4

With respect to similar electrophotographic photoconductive members C and D, polishing operation was carried out in a manner similar to Examples 1 to 5 except that 5 g. of the same cerium oxide particles as used in Examples 13 to 17 were used as a polishing material (Comparative Sample 3), and 5 g. of the same polymethylsilsesquioxane particles as used in Examples 13 to 17 were used as a polishing material (Comparative Sample 4), and further the characteristics before and after the polishing operation were investigated with respect to the similar items. The results thereby obtained are shown in Tables 4 and 5.

TABLE 4

| | | Photoconductive members | Surface roughness (μm) | V (V) | $V_0$ (V) | Holding rates (%) | $V_1$ (V) |
|---|---|---|---|---|---|---|---|
| (Before polishing) | | | | | | | |
| Examples | 13 | 13 | 0.1 | 550 | 200 | 36.4 | 45 |
| | 14 | 14 | 0.2 | 530 | 220 | 41.5 | 52 |
| | 15 | 15 | 0.1 | 580 | 220 | 37.9 | 48 |
| | 16 | 16 | 0.2 | 490 | 170 | 34.7 | 50 |
| | 17 | 17 | 0.1 | 460 | 180 | 39.1 | 42 |
| Comparative Examples | 3 | C | 0.2 | 530 | 230 | 43.4 | 55 |
| | 4 | D | 0.2 | 590 | 220 | 37.2 | 50 |

TABLE 5

| | | Photoconductive members | Polishing materials | Surface roughness (μm) | V (V) | $V_0$ (V) | Holding rates (%) | $V_1$ (V) |
|---|---|---|---|---|---|---|---|---|
| (After polishing) | | | | | | | | |
| Examples | 13 | 13 | Sample 13 | 0.3 | 820 | 730 | 89.0 | 20 |
| | 14 | 14 | Sample 14 | 0.3 | 780 | 710 | 91.0 | 15 |
| | 15 | 15 | Sample 15 | 0.2 | 850 | 820 | 96.4 | 5 |
| | 16 | 16 | Sample 16 | 0.2 | 880 | 860 | 97.7 | 5 |
| | 17 | 17 | Sample 17 | 0.4 | 860 | 830 | 96.5 | 5 |
| Comparative Examples | 3 | C | Comparative Sample 3 | 0.7 | 720 | 580 | 80.5 | 35 |
| | 4 | D | Comparative Sample 4 | 0.2 | 660 | 280 | 42.4 | 45 |

From the above results, it is seen that with use of the polishing materials of the present invention, it is possible to give adequate grinding and mirror finishing to the surface layer of the photoconductive layer of the electrophotographic photoconductive member, and it is possible to restore adequately satisfactorily the image forming characteristics, especially the electric characteristics.

EXAMPLE 18

2.5 g. of aluminum oxide particles having an average particle size of 2 microns and 2.5 g. of polypropylsilsesquioxane particles having an average particle size of 2 microns, were dispersed in 15 ml of isopropyl alcohol. With use of absorbent cotton soaked with this dispersion, the surface of the photoconductive layer of an electrophotographic photoconductive member, which was composed of a vapour deposited layer of selenium-tellurium containing 10% by weight of tellurium and which had characteristics degraded through use, was polished, whereupon the superior image forming characteristics were restored.

We claim:

1. A method of polishing an electrophotographic conductive member, which comprises polishing said member with polishing particles selected from the group consisting of (1) solid organic polishing particles composed of a polysilsesquioxane having, on its silicon atoms, substituents selected from the group consisting of a lower alkyl group having 2 to 5 carbon atoms, an alkoxy group, an aryl group and an aralkyl group; (2) a combination of said solid organic polishing particles and solid inorganic polishing particles in a weight ratio of 9:1 to 1:9; and (3) a combination of solid organic polishing particles composed of polymethylsilsesquioxane and solid inorganic polishing particles in a weight ratio of 9:1 to 1:9.

2. The method as claimed in claim 1, wherein said polishing particles are solid organic polishing particles composed of a polysilsesquioxane having, on its silicon atoms, substituents selected from the group consisting of a lower alkyl group having 2 to 5 carbon atoms, an alkoxy group, an aryl group and an aralkyl group.

3. The method as claimed in claim 1, wherein said polishing particles are a combination of solid organic polishing particles composed of (i) a polysilsesquioxane having, on its silicon atoms, substituents selected from the group consisting of a lower alkyl group having 1 to 5 carbon atoms, an alkoxy group, an aryl group and an aralkyl group, and (ii) solid inorganic polishing particles.

4. The method as claimed in claim 1, 2 or 3, wherein said substituents are the lower alkyl group and said lower alkyl group is selected from the group consisting of ethyl, propyl and butyl.

5. The method as claimed in claim 1, 2 or 3, wherein said substituents are the alkoxy group and said alkoxy group is selected from the group consisting of methoxy, ethoxy, propoxy and butoxy.

6. The method as claimed in claim 1, 2 or 3, wherein said substituents are the aryl group and said aryl group is phenyl.

7. The method as claimed in claim 1, 2 or 3, wherein said substituents are the aralkyl group and said aralkyl group is benzyl.

8. The method as claimed in claim 2 or 3, wherein the solid organic polishing particles have an average particle size of from 1 to 50 microns.

9. The method as claimed in claim 8, wherein the solid organic polishing particles have an average particle size of from 2 to 20 microns.

10. The method as claimed in claim 3, wherein the solid organic polishing particles have an average particle size of at least 7 microns and the solid inorganic polishing particles have an average particle size of at most 5 microns.

11. The method as claimed in claim 1, 2 or 3, wherein said electrophotographic photoconductive member comprises a photoconductive layer composed of selenium or a selenium-alloy containing one or more elements selected from the group consisting of tellurium, arsenic and antimony.

* * * * *